(12) United States Patent
Ishiyama et al.

(10) Patent No.: US 8,885,923 B2
(45) Date of Patent: Nov. 11, 2014

(54) FEATURE POINT SELECTING SYSTEM, FEATURE POINT SELECTING METHOD AND FEATURE POINT SELECTING PROGRAM

(75) Inventors: Rui Ishiyama, Tokyo (JP); Hiroyoshi Miyano, Tokyo (JP); Hidekata Hontani, Nagoya (JP); Fumihiko Sakaue, Nagoya (JP)

(73) Assignee: NEC Corporation, Tokyo (JP)

( * ) Notice: Subject to any disclaimer, the term of this patent is extended or adjusted under 35 U.S.C. 154(b) by 294 days.

(21) Appl. No.: 13/521,439

(22) PCT Filed: Jan. 11, 2011

(86) PCT No.: PCT/JP2011/000073
§ 371 (c)(1),
(2), (4) Date: Dec. 17, 2012

(87) PCT Pub. No.: WO2011/086889
PCT Pub. Date: Jul. 21, 2011

(65) Prior Publication Data
US 2014/0161346 A1 Jun. 12, 2014

(30) Foreign Application Priority Data
Jan. 12, 2010 (JP) ................................. 2010-003883

(51) Int. Cl.
*G06K 9/46* (2006.01)
*G06K 9/50* (2006.01)
*G06T 15/00* (2011.01)
*G06T 7/00* (2006.01)

(52) U.S. Cl.
CPC ............ *G06K 9/4604* (2013.01); *G06T 7/0042* (2013.01); *G06T 2207/30201* (2013.01); *G06T 2207/20081* (2013.01)
USPC ............ 382/154; 382/190; 382/201; 345/419

(58) Field of Classification Search
USPC ......... 382/100, 159, 185, 187, 229, 228, 203, 382/201, 224, 316, 199, 197, 202, 181, 190, 382/195, 154; 704/253, 241, 238, 233, 704/E15.016, E11.005, E15.039; 345/418, 345/419; 356/2
See application file for complete search history.

(56) References Cited

U.S. PATENT DOCUMENTS 7,873,190 B2 * 1/2011 Yuasa et al. ................... 382/118
7,925,076 B2 * 4/2011 Abe et al. ...................... 382/151

(Continued)

FOREIGN PATENT DOCUMENTS

| JP | 02-127783 A | 5/1990 |
| JP | 2007-233997 A | 9/2007 |
| JP | 2010-218051 A | 9/2010 |

OTHER PUBLICATIONS

International Search Report in PCT/JP2011/000073 dated Feb. 8, 2011(English Translation Thereof).

(Continued)

*Primary Examiner* — Sheela Chawan
(74) *Attorney, Agent, or Firm* — McGinn IP Law Group, PLLC

(57) ABSTRACT

A recognition task executing means 11 that provides a feature point selecting system which can select an adequate feature point matching a recognition algorithm in a recognition task executes the recognition task using an importance of each of a plurality of feature point candidates on a three-dimensional shape model for a plurality of evaluation images. A recognition error evaluating means 12 evaluates a recognition error related to all evaluation images from a difference between a recognition result of the recognition task and correct data of the recognition task for each evaluation image. A feature point importance determining means 13 sets a cost function which is represented as a function obtained by adding a restriction condition that an importance of an unimportant feature point candidate becomes close to zero, to the recognition error related to all evaluation images, and calculating the importance of each feature point candidate which minimizes a value of the cost function. A feature point selecting means 14 selects a feature point which needs to be used in the recognition task from the feature point candidates on the three-dimensional shape model based on the importance of each feature point candidate.

10 Claims, 8 Drawing Sheets

(56) References Cited

U.S. PATENT DOCUMENTS

| | | | |
|---|---|---|---|
| 8,340,451 B2* | 12/2012 | Noguchi et al. | 382/253 |
| 8,498,489 B2* | 7/2013 | Abe et al. | 382/209 |
| 2007/0183665 A1 | 8/2007 | Yuasa et al. | |
| 2007/0201729 A1 | 8/2007 | Yuasa et al. | |

OTHER PUBLICATIONS

"Entropy-Based Particle Systems for Shape Correspondence", Joshua Cates, Miriah Meyer, P. Thomas Fletcher, Ross Whitaker, Proceedings of the MICCAI, 2006.

"Gradient-Based Feature Extraction-SIFT and HOG-", Hironobu Fujiyoshi, Information Processing Society of Japan Report, CVIM 160, pp. 211 to 224, 2007.

"Face detection based on Generalized LVQ", Toshinori Hosoi, Tetsuaki Suzuki and Atsushi Sato, Technical report of IEICE. PRMU, vol. 102, No. 651 (Feb. 13, 2003), pp. 47 to 52.

"Three Dimensional CG created from photograph" Jo, Goh, Kindai kagaku sha Co., Ltd. p. 59-62 and Appendix F, 2001.

"Pattern Recognition and Machine Learning (Part 1)", C. M. Bishop, Springer Japan, Appendix E, 2007.

* cited by examiner

FEATURE POINT SELECTING SYSTEM, FEATURE POINT SELECTING METHOD AND FEATURE POINT SELECTING PROGRAM

TECHNICAL FIELD

The present invention relates to a feature point selecting system, a feature point selecting method and a feature point selecting program which select an effective feature point for a recognition task from a plurality of feature points on a three-dimensional shape model.

BACKGROUND ART

Processing of recognizing an object shown in an image or a state of the object is referred to as a "recognition task". The recognition task includes, for example, processing of estimating an orientation of an individual (hereinafter, "posture") from an image of the individual (for example, a face of a person) or identifying the individual. An example of the recognition task will be described using an example of posture estimation of an object. First, a three-dimensional position of a feature point on a three-dimensional shape model of an object is stored in advance. Generally, with a system in which a recognition target individual is newly registered after the system is activated, the feature point position is shared between all individuals. After the feature point is stored, the feature point position is detected from an image of the recognition target (an image showing the object for which the posture is estimated with the present example), and the three-dimensional position of the feature point stored in advance is associated. Further, the posture of the object is estimated based on the association between the position of the feature point in the recognition target image and the position of the feature point on the three-dimensional shape model. A method of estimating a posture of an object based on such an association is known as a solution of a perspective-n-point problem.

With the above processing, that a feature point on the three-dimensional shape model stored in advance is part of a recognition target and its position is easily specified in an image, and that the position of this site is important in the recognition task are both comprehensively taken into account, and are manually set. Manual setting of a feature point will be described in more detail. A recognition algorithm of executing a task such as posture estimation or individual identification can generally improve recognition performance when the number of feature points to be used is greater. However, when a great number of feature points are used, the computation amount of the recognition algorithm increases. Further, the computation amount for extracting feature points from a recognition target image increases. Hence, narrowing down the number of feature points is practically important. In order to improve the recognition performance in the recognition task using a small number of feature points, it is necessary to determine feature points satisfying the following conditions. The first condition requires that feature points are important in the recognition task (in other words, an influence on accuracy of the recognition algorithm is significant). Further, the second condition requires that feature points can be accurately extracted from an image. Generally, feature points satisfying both of the first condition and the second condition are manually determined from points on the three-dimensional shape model.

Non-Patent Literature 1 discloses, for example, a method of generating feature points based on an entropy as a method of automatically determining feature points on the three-dimensional model. However, this technique cannot narrow down the number of feature points to a useful small number of feature points for the recognition task taking both of the first condition and the second condition into account. Therefore, the definition of features points used for the recognition task is manually determined.

Further, feature points are extracted from a recognition target image by clipping each portion from the recognition target image, comparing each portion with a decision pattern learned in advance, and determining a position which is decided to be the most likely to be a feature point as a feature point position.

Non-Patent Literature 2 discloses a technique of extracting feature points required to find corresponding points between images according to a SIFT (Scale-Invariant Feature Transform) algorithm. The SIFT algorithm enables blob detection using multiresolution analysis, and association between images utilizing a histogram of a shading gradient. According to the SIFT algorithm, a feature amount of a feature point is calculated. By storing the feature amount of the decision pattern given in advance by way of learning and comparing with the feature amounts of the feature points extracted from the recognition target image, it is possible to decide whether or not points are feature points, and extract positions of the feature points.

Further, many pattern identifying methods can be utilized as a technique of making this decision. Non-Patent Literature 3 discloses, for example, Generalized Learning Vector Quantization (GLVQ). Although Non-Patent Literature 3 discloses detecting a pattern of a face, it is possible to detect feature points by changing the pattern from a face to feature points. Further, SVM (Support Vector Machine) is also known as a mechanical learning method.

How feature points are shown on a recognition target image change according to a posture of an object and lighting conditions. To correctly decide whether or not portions clipped from an image correspond to feature points, it is necessary to learn a decision pattern. Hence, multiple learning images of the object are captured under various conditions, and correct positions of feature points in these multiple learning images are manually input such that the decision pattern is learned.

CITATION LIST

Non-Patent Literature

NPL 1: "Entropy-Based Particle Systems for Shape Correspondence", Joshua Cates, Miriah Meyer, P. Thomas Fletcher, Ross Whitaker, Proceedings of the MICCAI, 2006

NPL 2: "Gradient-Based Feature Extraction—SIFT and HOG—", Hironobu Fujiyoshi, Information Processing Society of Japan Report, CVIM 160, pp. 211 to 224, 2007

NPL 3: "Face detection based on Generalized LVQ", Toshinori Hosoi, Tetsuaki Suzuki and Atsushi Sato, Technical report of IEICE. PRMU, Vol. 102, No. 651 (20030213), pp. 47 to 52

SUMMARY OF INVENTION

Technical Problem

Importance under the above first condition and accuracy of feature point extraction under the second condition depend on various factors such as a type of a recognition target object (shape or how the object looks like), the property of a method of extracting feature points from an image, the property of a method used in the recognition task (such as posture estimation or individual identification) and image capturing conditions of the recognition target image. Therefore, until the system which executes the recognition task is built and activated, it is difficult to quantify importance under the first condition and accuracy of feature point extraction under the second condition. Hence, a system developer subjectively has estimated such importance and accuracy. Therefore, a developer if not skilled one has difficulty in selecting adequate feature points satisfying the above first condition and second condition on the three-dimensional shape model, and has difficulty in providing maximum recognition performance which the algorithm of the recognition task has.

It is therefore an object of the present invention to provide a feature point selecting system, a feature point selecting method and a feature point selecting program which can select adequate feature points matching a recognition algorithm in a recognition task.

Solution to Problem

A feature point selecting system according to the present invention includes: a recognition task executing means that executes a recognition task using an importance of each of a plurality of feature point candidates on a three-dimensional shape model for a plurality of evaluation images which are generated from the three-dimensional shape model and which are used to evaluate a recognition error in the recognition task; a recognition error evaluating means that evaluates a recognition error related to all evaluation images from a difference between a recognition result of the recognition task executing means and correct data of the recognition task for each evaluation image; a feature point importance determining means that determines the importance of each feature point candidate by setting a cost function which is a function for the importance of each feature point candidate and which is represented as a function obtained by adding a restriction condition that an importance of an unimportant feature point candidate becomes close to zero, to the recognition error related to the all evaluation images, and calculating the importance of each feature point candidate which minimizes a value of the cost function; and a feature point selecting means that selects a feature point which needs to be used in the recognition task from the feature point candidates on the three-dimensional shape model based on the importance of each feature point candidate, wherein, with the recognition task executing means, the recognition error evaluating means and the feature point importance determining means, until the value of the cost function which is set based on the importance of each feature point candidate determined by the feature point importance determining means converges, repeatedly, the recognition task executing means executes the recognition task, the recognition error evaluating means evaluates the recognition error related to the all evaluation images and the feature point importance determining means determines the importance of the feature point candidates.

A feature point selecting method according to the present invention includes: executing a recognition task using an importance of each of a plurality of feature point candidates on a three-dimensional shape model for a plurality of evaluation images which are generated from the three-dimensional shape model and which are used to evaluate a recognition error in the recognition task; evaluating a recognition error related to all evaluation images from a difference between a recognition result of the recognition task and correct data of the recognition task for each evaluation image; determining the importance of each feature point candidate by setting a cost function which is a function for the importance of each feature point candidate and which is represented as a function obtained by adding a restriction condition that an importance of an unimportant feature point candidate becomes close to zero, to the recognition error related to the all evaluation images, and calculating the importance of each feature point candidate which minimizes a value of the cost function; until the value of the cost function which is set based on the importance of each determined feature point candidate converges, repeatedly executing the recognition task, evaluating the recognition error related to the all evaluation images and determining the importance of the feature point candidates; and selecting a feature point which needs to be used in the recognition task from the feature point candidates on the three-dimensional shape model based on the importance of each feature point candidate.

A feature point selecting program according to the present invention causes a computer to execute: recognition task executing processing of executing a recognition task using an importance of each of a plurality of feature point candidates on a three-dimensional shape model for a plurality of evaluation images which are generated from the three-dimensional shape model and which are used to evaluate a recognition error in the recognition task; recognition error evaluating processing of evaluating a recognition error related to all evaluation images from a difference between a recognition result of the recognition task executing processing and correct data of the recognition task for each evaluation image; feature point importance determining processing of determining the importance of each feature point candidate by setting a cost function which is a function for the importance of each feature point candidate and which is represented as a function obtained by adding a restriction condition that an importance of an unimportant feature point candidate becomes close to zero, to the recognition error related to the all evaluation images, and calculating the importance of each feature point candidate which minimizes a value of the cost function; and feature point selecting processing of selecting a feature point which needs to be used in the recognition task from the feature point candidates on the three-dimensional shape model based on the importance of each feature point candidate, wherein the computer is caused to repeat the recognition task executing processing, the recognition error evaluating processing and the feature point importance determining processing until the value of the cost function which is set based on the importance of each feature point candidate determined by the feature point importance determining processing converges.

Advantageous Effects of Invention

According to the present invention, it is possible to select an adequate feature point matching a recognition algorithm in a recognition task.

DESCRIPTION OF EMBODIMENTS

Hereinafter, embodiments of the present invention will be described with reference to the drawings.

First Embodiment

Figure 1:
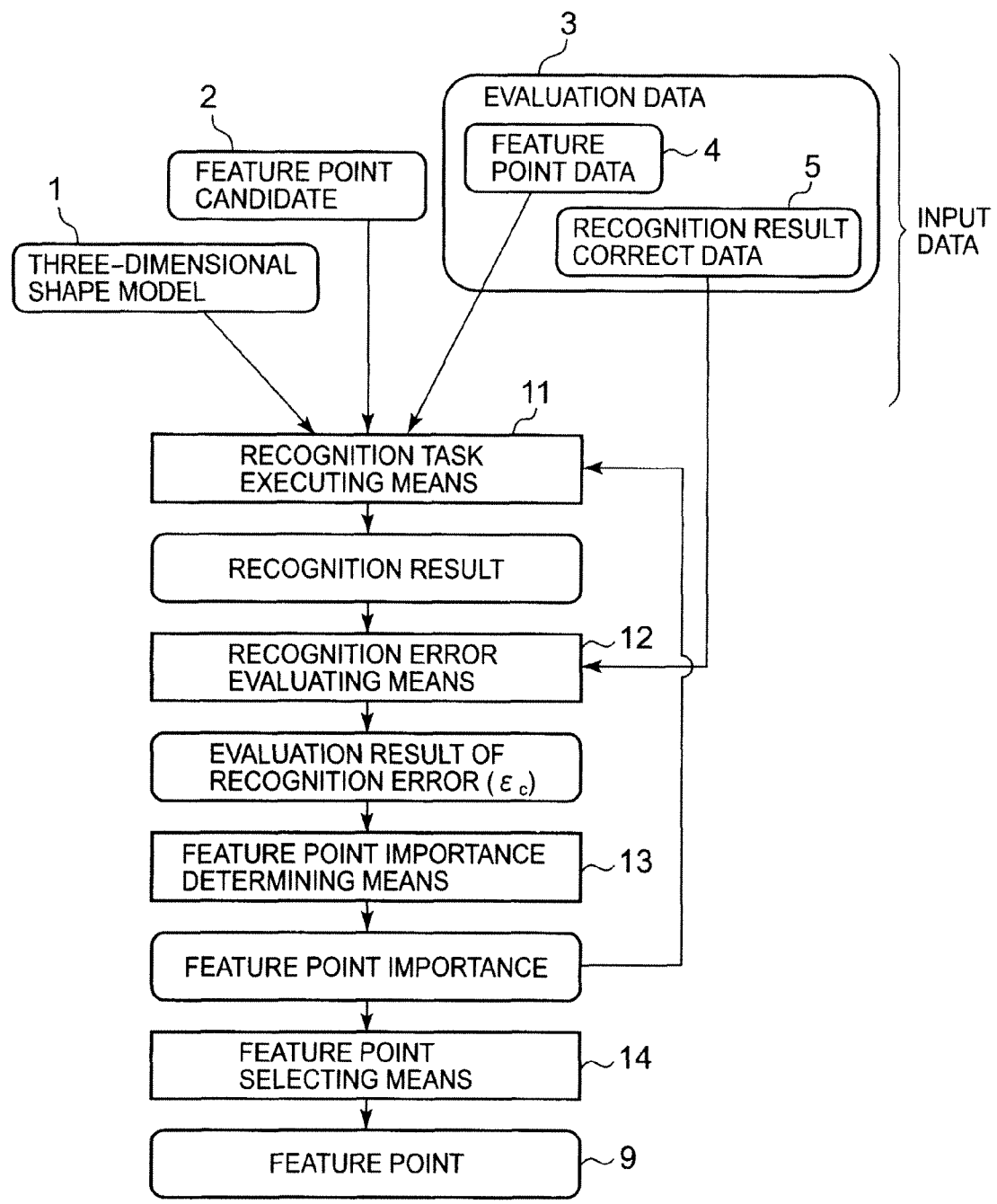
FIG. 1 illustrates a block diagram that illustrates an example of a feature point selecting system according to a first embodiment of the present invention.

FIG. 1 illustrates a block diagram that illustrates an example of a feature point selecting system according to a first embodiment of the present invention. A feature point selecting system according to the first embodiment receives inputs of a three-dimensional shape model 1, a plurality of feature point candidates 2 on the three-dimensional shape model 1 and evaluation data 3 as input data. The feature point candidates 2 are candidates of a plurality of feature points on the three-dimensional shape model 1, and are represented as positions on the three-dimensional shape model 1. Further, the evaluation data 3 includes an evaluation image group (not illustrated in FIG. 1) under various image capturing conditions used to evaluate performance of the recognition task, feature point data 4 which is obtained as a result of executing feature point extraction from the evaluation image group and correct data (recognition result correct data) 5 of the recognition task for the evaluation image group. The feature point data 4 is data of a feature point on an evaluation image, and is represented as a position in the evaluation image. In addition, although the type of the recognition task is by no means limited in particular, the recognition task handled by the feature point selecting system is set in advance. Further, the evaluation image is an image created from the three-dimensional shape model 1, and is an image used to evaluate a recognition error in the recognition task. Furthermore, feature points only need to be extracted from the evaluation image group using a feature point extractor which decides whether or not a pattern is a feature point when, for example, a given pattern (part of an image) is input. The feature point extractor only needs to learn in advance internal data for making such decision.

The feature point selecting system according to the first embodiment selects a feature point 9 of high importance which can minimize a recognition error in a recognition task set in advance, from a plurality of feature point candidates 2 on the three-dimensional shape model 1, and outputs the feature point 9.

The feature point selecting system according to the first embodiment of the present invention has a recognition task executing means 11, a recognition error evaluating means 12, a feature point importance determining means 13 and a feature point selecting means 14.

The recognition task executing means 11 executes the recognition task set in advance using the feature point data 4 obtained from each evaluation image included in the evaluation data 3. The type of the recognition task is by no means limited in particular. For example, the recognition task executing means 11 may estimate the posture or identify an individual such as a face. Alternatively, for example, a facial expression or an age may be estimated.

Meanwhile, features of the present invention include executing the recognition task by assigning a weight to each feature point. The recognition task which is executed by assigning a weight to each feature point is referred to as a "weighted recognition task". The weight for each feature point is the importance of a feature point from the view point of minimizing a recognition error in the recognition task, and a weight for a feature point is described as importance of a feature point in some cases. Upon comparison of a general recognition task and a weighted recognition task according to the present invention, the general recognition task is directed to find a recognition result which minimizes a sum of a reproduction error when a position of each feature point is reproduced using the recognition result. By contrast with this, the weighted recognition task according to the present invention is directed to find a recognition result which minimizes the sum of values obtained by multiplying a weight indicating the importance of each feature point with the reproduction error. The weight for a feature point (an importance of a feature point) is a value set for individual feature points. Further, the same importance as the importance of each feature point is used when a recognition task is executed for each evaluation image included in the evaluation data 3. That is, the importance of a feature point is set for individual feature points. Further, each importance of each feature point does not change per evaluation image.

Furthermore, the recognition task executing means 11 performs processing of finding a recognition error produced as a recognition result of the recognition task every time the recognition task executing means 11 executes the weighted recognition task for each evaluation image included in the evaluation data 3. The recognition error is a difference between the recognition result obtained by the recognition task, and recognition result correct data.

When, for example, the recognition task is posture estimation, the recognition task executing means 11 only needs to calculate for the evaluation image included in the evaluation data 3 a difference between an orientation obtained as a result of estimating the posture using a feature point set (a set of feature points) and a correct posture as a recognition error. Further, when individual identification is performed based on a face image as a recognition task, the three-dimensional shape models 1 of a plurality of people and information for specifying a plurality of feature points on the three-dimensional shape models 1 are prepared, and the evaluation data 3 of each person is also created. Furthermore, as a result of recognizing a face of the evaluation data 3 using a feature point set, the rate of a person for which face recognition is failed is calculated as a recognition error. An example of the recognition task described above is an example, and is by no means limited to this.

In addition, although the recognition task executing means 11 executes the weighted recognition task, and also finds the recognition error, instead of the recognition task executing means 11, the recognition error evaluating means 12 may calculate a recognition error. FIG. 1 illustrates an example where the recognition error evaluating means 12 finds a recognition error using the recognition result correct data 5.

Hereinafter, an execution example of the recognition task executed by the recognition task executing means 11 will be described in detail. Hereinafter, a case will be described as an example where the recognition task executing means 11 executes posture estimation related to an evaluation image as a recognition task. The posture estimation related to an evaluation image is a processing of calculating a posture θ which minimizes an error (reprojection error) between "a position of a feature point extracted from an evaluation image (that is, the feature point data 4)" and "a position of a feature point on an image at a given posture which is calculated from the feature point (feature point candidate 2) on the three-dimensional shape model 1". θ is a six-dimensional vector in which rotary angles of an object and three-dimensional positions are aligned.

A position of a feature point i extracted from an evaluation image is vector $y_i$. This vector $y_i$ corresponds to the feature point data 4 illustrated in FIG. 1. Further, a position of the feature point i on an image when a posture of an object calculated from the three-dimensional shape model 1 is θ is represented as vector $x_i(\theta)$. That is, $x_i(\theta)$ is a feature point on an image when the posture of the three-dimensional shape model 1 is θ, and is a position of a feature point corresponding to the feature point on the three-dimensional shape model 1.

According to general posture estimation, reprojection error $\epsilon_a$ is represented by following equation 1.

$$\epsilon_a = \Sigma_i (y_i - x_i(\theta))^T (y_i - x_i(\theta)) \quad \text{(Equation 1)}$$

Meanwhile, the position of the feature point on the three-dimensional shape model 1 is $x_i$, and a perspective camera matrix determined based on the posture θ is $P_p(\theta)$. In addition, the position $X_i$ of the feature point on the three-dimensional shape model 1 corresponds to the feature point candidate 2 illustrated in FIG. 1. In this case, $x_i(\theta)$ is found according to following equation 2.

$$x_i(\theta) = P_p(\theta) X_i \quad \text{(Equation 2)}$$

Further, $P_p(\theta)$ is found according to following equation 3.

$$P_p(\theta) = A[RT] \quad \text{(Equation 3)}$$

In equation 3, A is a matrix representing an internal parameter of a camera, and only needs to be set to a realistic value as an internal parameter matrix of the camera. R and T are set as a rotation vector and a parallel shift vector at each posture θ. The recognition task of general posture estimation is formulated as a problem of finding a value of the posture parameter θ which minimizes a value of $\epsilon_a$ in equation 1. This problem can be solved using a solution of a non-linear least-square method, and multiple methods are generally known. By, for example, applying a method disclosed in following cited reference 1, it is possible to find the posture parameter θ which minimizes the value of $\epsilon_a$.

[Reference Literature 1]

"Three-dimensional CG created from photograph" Jo, Goh, Kindai kagaku sha Co., Ltd, P. 59-62 and Appendix F The recognition task executing means 11 according to the present invention introduces a weight $w_i$ representing an importance in the recognition task of each feature point i, and executes posture estimation as a weighted recognition task. That is, when executing posture estimation, the recognition task executing means 11 calculates a reprojection error $\epsilon_b$ (hereinafter, referred to as a "weighted reprojection error") by performing calculation including multiplication of the weight $w_i$ and calculating the posture θ which minimizes the weighted reprojection error $\epsilon_b$ according to following equation 4.

$$\epsilon_b = \Sigma_i w_i (y_i - x_i(\theta))^T (y_i - x_i(\theta)) \quad \text{(Equation 4)}$$

Each $w_i$ is set per feature point corresponding to the feature point candidate 2. The recognition task executing means 11 execute the recognition task (posture estimation with the present example) using $w_i$ which has already been set at a point of time when the recognition task is executed. $w_i$ is already known when the recognition task is executed, so that it is possible to calculate the posture θ which minimizes the weighted reprojection error $\epsilon_b$ according to the very same method as in a case where the posture parameter θ which minimizes a value of $\epsilon_a$ upon general posture estimation is found.

In addition, as described below, the feature point selecting system according to the present invention performs loop processing including the recognition task and importance calculation of a feature point. When executing the recognition task for the first time, the recognition task executing means 11 only needs to use a value set as a default value of the importance $w_i$. Further, when executing the recognition task in the second or subsequent loop processing, the recognition task executing means 11 only needs to use the importance $w_i$ found in importance calculation processing immediately before.

The recognition task executing means 11 executes the weighted recognition task (calculates the posture θ which minimizes the weighted reprojection error $\epsilon_b$ with the present example) for each of all evaluation images included in the evaluation data 3. The posture calculated as a recognition result for an evaluation image j is $\theta_j$.

The recognition error evaluating means 12 evaluates an error of the recognition result obtained by the recognition task executing means 11. More specifically, the recognition error evaluating means 12 calculates a value representing the degree of the error of the recognition result related to all evaluation images, and uses this calculation result as an evaluation result of the error of the recognition result. This evaluation result is described as "$\epsilon_c$". The evaluation data 3 includes a correct value of the recognition result for each evaluation image j (that is, the recognition result correct data 5). Similar to the above example, when the recognition task is posture estimation, the recognition result correct data 5 is a correct value of the posture $\theta_j$. This correct value is described as "$\theta^*_j$". In this case, the recognition error evaluating means 12 may, for example, perform calculation according to following equation 5, and calculate the evaluation result $\epsilon_c$ of the error of the recognition result related to all evaluation images.

$$\epsilon_c = \Sigma_j (\theta_j - \theta^*_j)^2 \quad \text{(Equation 5)}$$

That is, the recognition error evaluating means 12 may calculate the square of a difference between $\theta_j$ obtained by the weighted recognition task and the correct value $\theta^*_j$ per evaluation image, and use the sum of the squares as the evaluation result $\epsilon_c$. This evaluation result $\epsilon_c$ is the sum of recognition errors for all evaluation images (more accurately, the sum of squares of the recognition errors).

In addition, as already described, the recognition task executing means 11 may execute the weighted recognition task and also find the recognition error, or the recognition error evaluating means 12 may calculate the recognition error. With an example indicated in equation 5, the recognition task executing means 11 may execute the weighted recognition task, and calculate $(\theta_j - \theta^*_j)$. Alternatively, the recognition error evaluating means 12 may perform the entire calculation of equation 5 including calculation of $(\theta_j - \theta^*_j)$.

The feature point importance determining means 13 calculates an importance (weight) of a feature point which minimizes the evaluation result $\epsilon_c$ of the error of the recognition result. This calculation means finding the importance of the feature point which minimizes the sum of recognition errors for all evaluation images (the sum of squares of recognition errors with the example). Features of the present invention lie in adding a suitable restriction condition for performing feature point selection which relates to this importance and which is an object of the present invention. An object of the present invention is to select a small number of adequate feature points from an input feature point candidate group (a plurality of feature point candidates 2 on the three-dimensional shape model 1) to minimize the recognition error using feature points as least as possible. Hence, the restriction condition that a L1 norm of a vector which has an importance of each feature point as an element is minimized is added upon calculation of the importance such that a weight value becomes sparse according to the degree of importance, that is, a value of an unimportance point becomes close to zero as much as possible. That is, a function obtained by adding to $\epsilon_c$ the L1 norm of the vector which has the importance of each feature point as an element is defined as a cost function J as indicated in following equation 6. In addition, a restriction condition that the L1 norm of the vector which has the importance of each feature point as an element is minimized such that a value of an unimportant point becomes close to zero as much as possible is a restriction condition that the importance of each feature point is made discrete.

$$J(w) = \epsilon_c + \alpha |w|_1 = \Sigma_j(\theta_j - \theta^*_j)^2 + \alpha |w|_1 \quad \text{(Equation 6)}$$

In equation 6, w is a vector which has the importance of each feature point as an element. $\alpha$ is a constant parameter which defines to what extent the above restriction condition is made effective, and a value of $\alpha$ is set to an adequate value in advance. w (that is, the importance of each feature point) is determined, and the recognition task executing means 11 executes the weighted recognition task and the recognition error evaluating means 12 calculates the evaluation result $\epsilon_c$ of the recognition error, so that the feature point importance determining means 13 can calculate a value of the cost function J. Therefore, the cost function J becomes the function of the importance w, and may be represented by J(w).

The importance of the feature point upon posture estimation is formulated as a restricted optimization problem for a non-linear function J(w). Various methods of finding the optimal solution by setting an adequate default value and performing repetition processing are already known as this optimization calculating method. As disclosed in, for example, Reference Literature 2, there is a calculating method using the Lagrange multiplier.

[Reference Literature 2]

"Pattern Recognition and Machine Learning (Part 1)", C. M. Bishop, Springer Japan, Appendix E Details of processing will be described below. First, the default value of the importance (weight) is determined. Although there are various methods of determining the default value, there is, for example, a method of making all weights uniform. That is, when the number of feature points is N, the default value of the weight $w_i$ of each feature point is set as $w_i = 1/N$. Next, the feature point importance determining means 13 finds a weight (more specifically, the vector w) which minimizes a value of the cost function J(w) while changing the vector w which has the importance of each feature point as an element. That is, while updating from the default value the vector w which has the importance of each feature point as an element, repeatedly, the recognition task executing means 11 executes the weighted recognition task and the recognition error evaluating means 12 executes calculation of an evaluation result of a recognition error, and the feature point importance determining means 13 finds w when a value of J(w) converges as optimal w. As a result, it is possible to find the optimal importance of each feature point.

With the above processing, the recognition task executing means 11 repeatedly executes the weighted recognition task until a value of the cost function converges. A feature point having a value of the importance $w_i$ which becomes equal to or less than a threshold while the importance of each feature point is optimized (optimization of w) is excluded from a calculation target assuming $w_i=0$. By so doing, it is possible to increase a calculation processing speed of the weighted recognition task. This threshold may be set in advance.

The feature point selecting means 14 selects a feature point according to the determined importance of each feature point. In addition, the importance of each feature point is determined by the feature point importance determining means 13 as the vector w which has the importance of each feature point as an element. The feature point selecting means 14 selects a predetermined number of feature points from, for example, the feature point candidates 2 input to the feature point selecting system according to the present invention in order from the highest importance. A desired number of feature points to select only needs to be set in advance taking the computation amount into account upon execution of the recognition task. The feature point selecting means 14 outputs the selected feature points as feature points suitable for the recognition task.

The method adopted by the feature point selecting means 14 to select feature points is by no means limited to the above method. For example, a threshold for deciding whether or not to select an importance of a feature point may be set, and the feature point selecting means 14 may select only feature points having the importances exceeding this threshold and may not select feature points having importances equal to or less than this threshold.

Further, a method may be adopted of sequentially selecting feature points in order from the highest importance and setting a threshold for a cumulative value of importances of the selected feature points. For example, the feature point selecting means 14 sequentially selects feature points in order from the highest importance, and calculates the cumulative value obtained by adding the importances of the selected feature points every time the feature points are selected. Further, the feature point selecting means 14 may stop selecting feature points when this cumulative value exceeds the threshold set in advance, and output each feature point selected so far as a feature point suitable for the recognition task. Alternatively, at a point of time when the cumulative value exceeds the threshold, a feature point which is finally selected may be excluded, and each feature point selected while the condition that the cumulative value is equal to or less than the threshold is satisfied may be output as a feature point suitable for the recognition task.

Further, a method may be adopted of sorting importances from the highest importance, determining the order that a value rapidly decreases, and selecting only feature points of higher importances. For example, the feature point selecting means 14 sorts importances from the highest importance, and calculates a difference between importances of preceding and subsequent ranks. Further, when this difference is greater than the threshold set in advance, feature points matching each importance of a higher order among two importances which are calculation targets of this difference may be selected. That is, a difference between importances of preceding and subsequent ranks such as the first rank and the second rank or the second rank and the third rank may be calculated, and, when the difference between kth and k+1th importances is greater than the threshold, the feature point selecting means 14 may select each feature point having the sorted importance of the first rank to the kth rank.

The recognition task executing means 11, the recognition error evaluating means 12, the feature point importance determining means 13 and the feature point selecting means 14 are realized by, for example, a CPU of a computer which operates according to the feature point selecting program. For example, the CPU may read the feature point selecting program from a memory device (not illustrated) of the feature point selecting system, and operate as each of the above means according to this program. Alternatively, each of the means 11 to 14 may be realized by separate dedicated circuits.

Next, an operation will be described.

Figure 2:
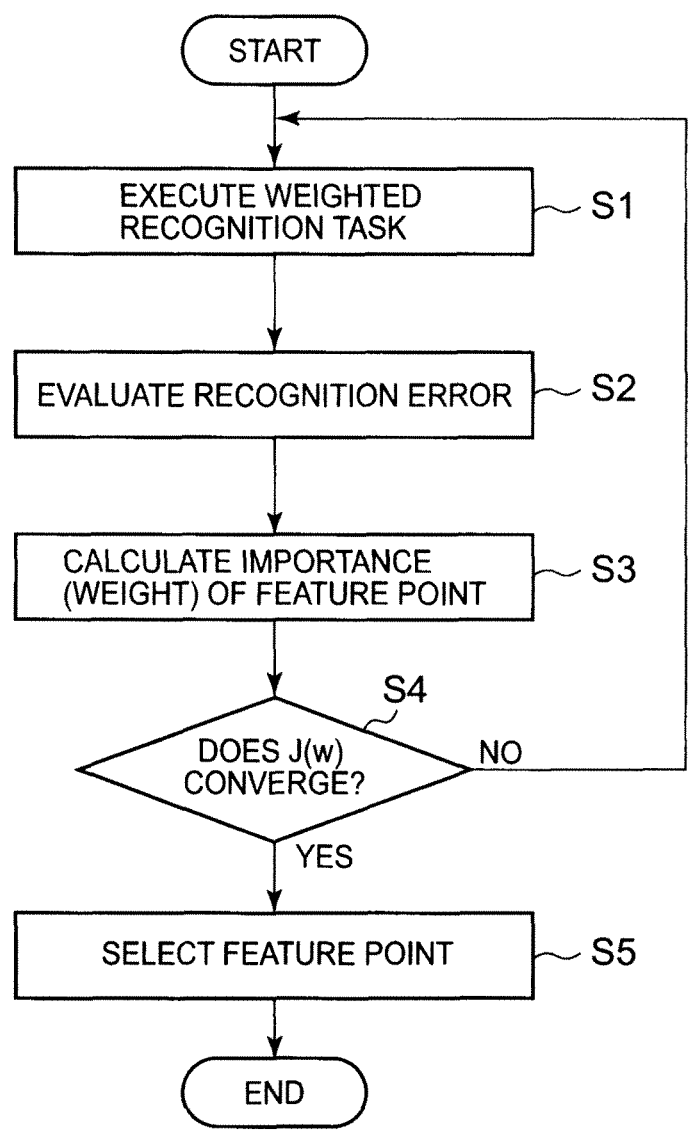
FIG. 2 illustrates a flowchart that illustrates an example of a processing flow according to the first embodiment.

FIG. 2 illustrates a flowchart that illustrates an example of a processing flow of the feature point selecting system according to the first embodiment. In the following description, a case will be described as an example where posture estimation is executed as a recognition task.

First, the recognition task executing means 11 executes the weighted recognition task (step S1). For example, the recognition task executing means 11 finds the posture θ which minimizes the weighted reprojection error $\epsilon_1$, in equation 4. Further, when executing step S1 first, the default value of the importance $w_i$ needs to be set in advance to use this default value. As already described, when the number of feature points is N, $w_i=1/N$ may be set by making the default value of the weight $w_i$ of each feature point uniform.

Next, the recognition error evaluating means 12 calculates the evaluation result $\epsilon_c$ of the error of the recognition result related to all evaluation images (step S2). For example, the recognition error evaluating means 12 only needs to calculate c by calculating equation 5.

Next, the feature point importance determining means 13 calculates the importance of each feature point (step S3). For example, the feature point importance determining means 13 sets the cost function J(w) obtained by adding to $\epsilon_c$ the L1 norm of the vector which has the importance of each feature point as an element (see equation 6), and finds the vector w which minimizes the value of the cost function J(w). The element of this vector is the importance of each feature point.

Next, the feature point importance determining means 13 decides whether or not the cost function J(w) converges (step S4). When, for example, an absolute value of a difference between a minimum value of J(w) set from the vector w found in step S3 of previous loop processing and a minimum value of J(w) set from the vector w found in step S3 of loop processing this time (that is, step S3 immediately before) is a threshold set in advance or less, the feature point importance determining means 13 only needs to decide that J(w) has converged. By contrast with this, when the absolute value of this difference is greater than the threshold set in advance, the feature point importance determining means 13 only needs to decide that J(w) does not converge.

When deciding that J(w) does not converge (No in step S4), the feature point selecting system repeats processing in step S1 and subsequent steps. In second or subsequent step S1, the importance $w_i$ of each feature point calculated in previous step S3 only needs to be used.

Further, the feature point importance determining means 13 may set $w_i=0$ for feature points having values of the importances $w_i$ equal to or less than the threshold. This means that feature points having values of the importances $w_i$ equal to or less than the threshold are excluded from processing targets of the weighted recognition task executed by the recognition task executing means 11.

When deciding that J(w) has converged (Yes in step S4), the feature point selecting means 14 selects a feature point from the input feature point candidates 2 based on the importance determined in step S3 immediately before, and outputs the selected feature point as a feature point suitable for the recognition task.

According to the present embodiment, the feature point data 4 included in the evaluation data 3 includes a feature point extraction error which is likely to be produced when an evaluation image is actually used in a recognizing system. According to the present embodiment, the recognition task is executed by using this feature point data 4 and assigning a weight of the importance to each feature point to evaluate the recognition error. Further, a value of the importance is found which minimizes the recognition error. With the above example, the cost function J(w) is set which is obtained by adding a restriction condition that a value of an unimportant point becomes close to zero as much as possible, to the evaluation result as the recognition error, and the importance of each feature point is found which minimizes J(w). By performing processing in this way, it is possible to evaluate to what extent each feature point specified on the three-dimensional shape model 1 is important for the purpose of minimizing a recognition error in an actual situation that the recognizing system is operated. Consequently, by, for example, selecting predetermined number of feature points in order from the highest importance, it is possible to select a feature point which enables an accurate recognition task to be executed using a limited number of feature points. In addition, a selecting method of selecting a predetermined number of feature points in order from the highest importance is an exemplary method, and adequate feature points can be selected by other feature point selecting methods based on the importance.

Further, although posture estimation or individual identification has been described as an example of the recognition task, the recognition task is by no means limited to these processing. For example, the recognition task may be processing of estimating a deformation amount of an object instead of a posture or processing of recognizing a facial expression in a face image.

Second Embodiment

Figure 3:
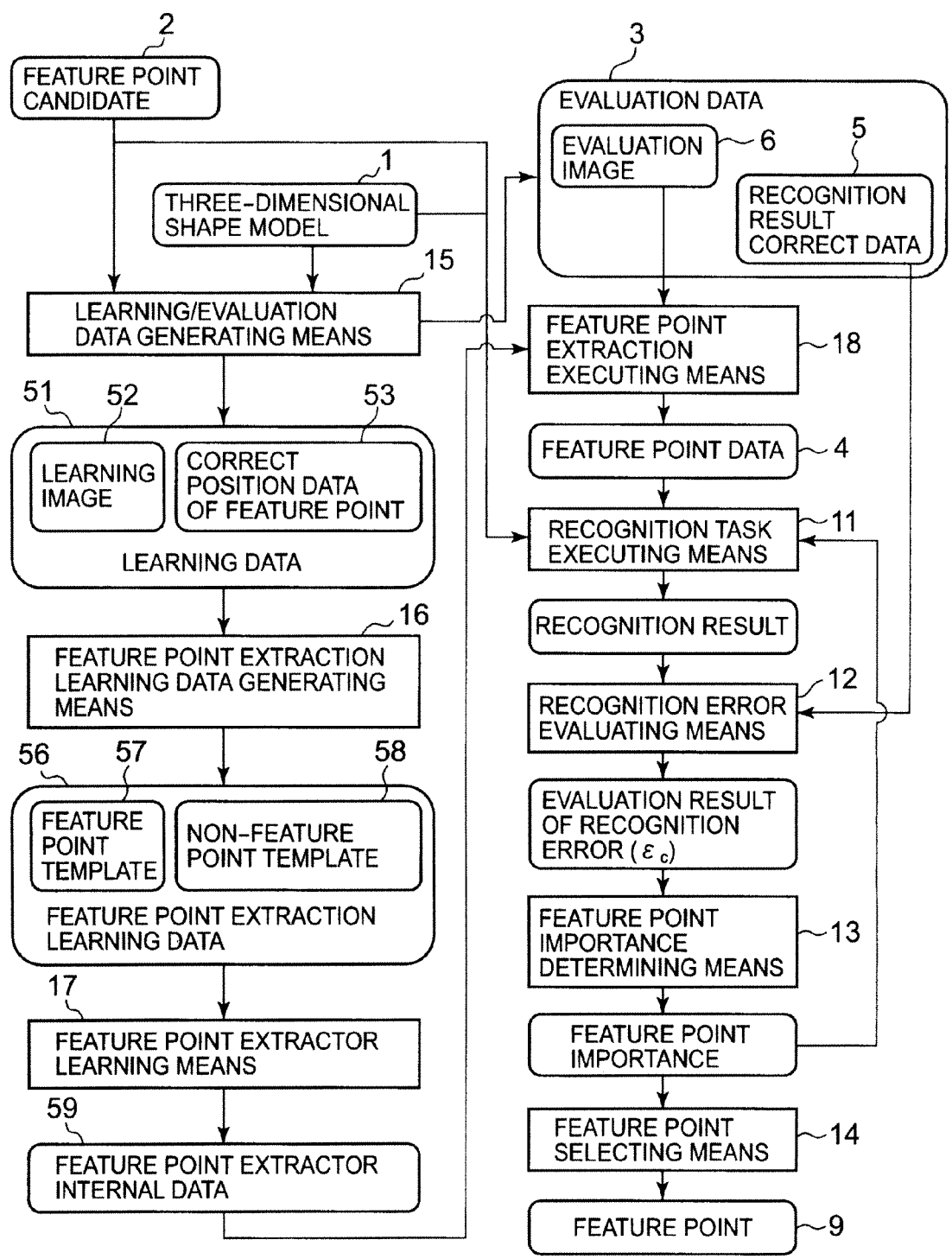
FIG. 3 illustrates a block diagram that illustrates an example of a feature point selecting system according to a second embodiment of the present invention.

FIG. 3 illustrates a block diagram that illustrates an example of a feature point selecting system according to a second embodiment of the present invention. The same components and data as in the first embodiment will be assigned the same reference numerals as in FIG. 1, and will not be described in detail. The feature point selecting system according to the second embodiment has a recognition task executing means 11, a recognition error evaluating means 12, a feature point importance determining means 13 and a feature point selecting means 14 and, in addition, a learning/evaluation data generating means 15, a feature point extraction learning data generating means (hereinafter, "feat-ex learning data generating means") 16, a feature point extractor learning means 17 and a feature point extraction executing means 18.

According to the second embodiment, a three-dimensional shape model 1 and a plurality of feature point candidates 2 on the three-dimensional shape model 1 are input data, and the feature point selecting system generates evaluation data 3. Hence, with the second embodiment, an evaluation image group under various image capturing conditions used to evaluate performance of a recognition task, feature point data 4 which is obtained as a result of executing feature point extraction from the evaluation image group and correct data 5 of the recognition task for the evaluation image group do not need to be input to the feature point selecting system.

In order to select truly important feature points to improve recognition performance of the recognition task, the feature point candidates 2 to be input need to cover all important points. That is, the number of feature point candidates to be input needs to be great. Particularly, when an object includes multiple feature points or, by contrast with this, when there are not clear feature points and there are multiple points which are hard to rate, it is not possible to select important feature points unless a great number of feature point candidates 2 are prepared. Further, when feature points are selected targeting at a recognition task which uses images captured under various environments as recognition targets, a feature point extractor which can operate under various environment is required. With the present embodiment, it is possible to automatically generate the feature point extractor for feature points when a great number of feature point candidates are obtained to cover effective feature points, and it is possible to finally select more accurate feature points as a result by using the feature point extractor.

Further, in the following description, a template means a local area clipped from an image, and a size of a template is referred to as a "template size".

The learning/evaluation data generating means 15 receives inputs of the three-dimensional shape model 1, and information for specifying a plurality of feature points on the three-dimensional shape model 1 (feature point candidates 2). A texture is pasted on the three-dimensional shape model 1. The learning/evaluation data generating means 15 generates learning data 51 and evaluation data 3 including an image which is obtained by variously changing, for example, the posture (orientation) of the input three-dimensional shape model 1 or a position of a light with respect to the three-dimensional shape model 1. The learning data 51 generated by the learning/evaluation data generating means 15 includes a plurality of learning images 52 which are obtained by variously changing, for example, the posture of the three-dimensional shape model 1 or the position of a light, and correct position data 53 of a feature point in these learning images 52. Further, the evaluation data 3 generated by the learning/evaluation data generating means 15 includes a plurality of evaluation images 6 which are obtained by variously changing, for example, the posture of the three-dimensional shape model 1 or the position of a light, and the correct data 5 of the recognition task for each evaluation image 6. The learning image 52 and the evaluation image 6 are common in that they are images which can be obtained by variously changing, for example, the posture of the three-dimensional shape model 1 or a position of a light with respect to the three-dimensional shape model 1. Meanwhile, the learning image 52 and the evaluation image 6 have varying conditions such as the posture (orientation) or the position of a light. The learning/evaluation data generating means 15 generates the learning image 52 and the evaluation image 6 as a two-dimensional CG (Computer Graphics) image using the three-dimensional shape model 1.

Meanwhile, the feature point extractor, and the learning data 51 and the evaluation data 3 generated by the learning/evaluation data generating means 15 will be described. The feature point extractor decides whether or not, when a given pattern is input, this pattern is a feature point. Generally, the feature point extractor learns in advance internal data for making such decision. Various pattern identifying methods and feature extracting operators can be utilized for the feature point extractor.

For example, a SIFT feature amount disclosed in Non-Patent Literature 2 can be used. In this case, upon learning, the SIFT feature extraction operator is applied to a position corresponding to a feature point of learning data (learning image 52), and the SIFT feature amount is extracted. Further, this SIFT feature amount is stored as internal data. When an image which is a given recognition target is input according to, for example, the recognition task, the SIFT feature amount is extracted from this image and is compared with internal data to decide whether or not this template corresponds to a feature point.

Further, it is also possible to use a pattern identifying method such as GLVQ disclosed in Non-Patent Literature 3 as another method. With the present embodiment, these methods will be described in detail. Upon learning, a plurality of templates which correspond to feature points and a plurality of templates which do not correspond to feature points are input, and internal data is generated from these templates. Further, when a given template is input according to, for example, a recognition task, the feature point extractor decides whether or not the template corresponds to a feature point by comparing the template with internal data. An image group which the feature point extractor uses to clip a template for learning internal data is the learning image 52. Further, data including the learning image 52 and correct position data 53 of a feature point in the image group (learning image 52) is included in the learning data 51 generated by the learning/evaluation data generating means 15.

Furthermore, an image group which is prepared separately from learning data to evaluate at what degree of accuracy it is possible to extract a feature point when the feature point extractor which has learned internal data is used in an actual recognition task is the evaluation image 6. Still further, the evaluation image 6, and recognition result correct data 5 representing a correct answer of a recognition result when the recognition task is executed for this evaluation image 6 is included in the evaluation data 3 generated by the learning/evaluation data generating means 15.

The learning/evaluation data generating means 15 generates as the learning image 52 and the evaluation image 6 CG (Computer Graphics) images which are obtained by variously changing, for example, the posture (orientation) of the three-dimensional shape model 1 and the position of the light on the three-dimensional shape model 1. Meanwhile, the conditions such as the posture (orientation) of the three-dimensional shape model 1 and the position of the light with respect to the three-dimensional shape model 1 are made different between the learning image 52 and the evaluation image 6. Except that conditions are different upon generation of an image, the learning/evaluation data generating means 15 generates the learning image 52 and the evaluation image 6 by performing the same processing. Further, the learning/evaluation data generating means 15 generates a plurality of images which serve as the learning images 52 and a plurality of images which serve as the evaluation images 6. The learning/evaluation data generating means 15 preferably generates multiple images by setting various posture/light conditions to cover image capturing conditions for images which are recognition targets in the recognition task.

Figure 4:
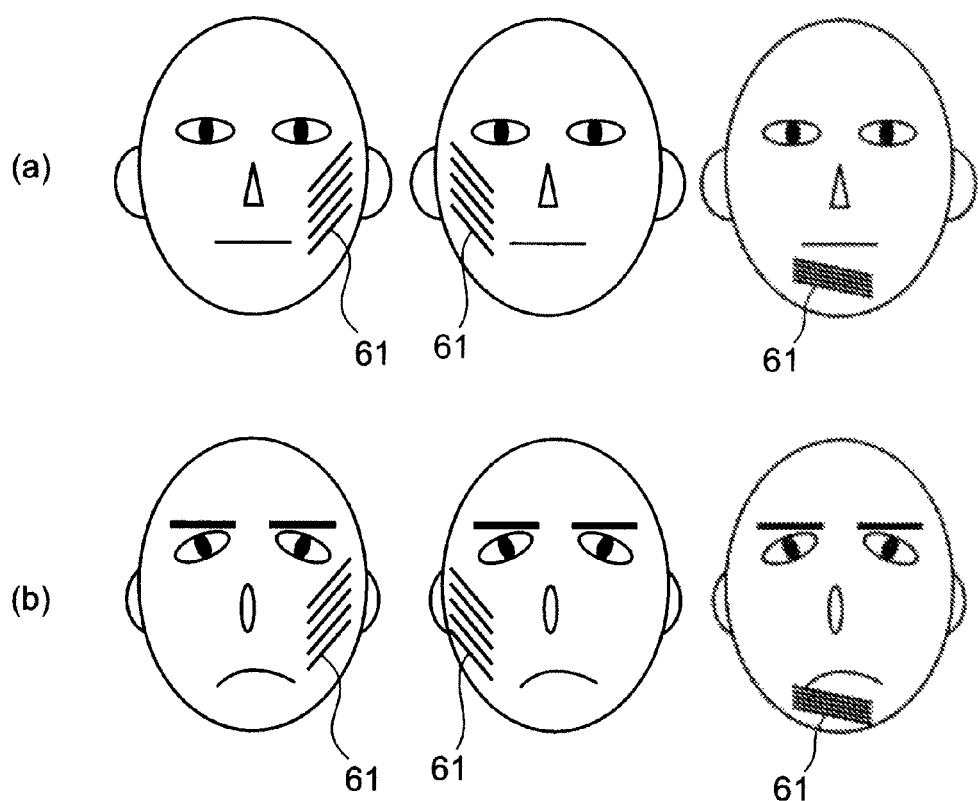
FIG. 4 illustrates an explanatory view that illustrates examples of images which serve as learning images and evaluation images.

FIG. 4 illustrates an explanatory view that illustrates examples of images which serve as the learning images 52 and the evaluation images 6. FIG. 4 illustrates examples of images generated from two types of three-dimensional shape models. FIG. 4(a) illustrates a plurality of types of images generated from a given three-dimensional shape model, and FIG. 4(b) illustrates a plurality of types of images generated from another three-dimensional shape model. In each image illustrated in FIGS. 4(a) and (b), a portion at which a shadow 61 appears changes by changing the light position condition. Although FIG. 4 illustrates various images obtained by changing the light position condition, the learning/evaluation data generating means 15 may also generate images obtained by changing the posture of the three-dimensional shape model, as the learning image 52 and the evaluation image 6.

Further, the learning/evaluation data generating means 15 receives inputs of feature point candidates 2 specified as a feature point group on the three-dimensional shape model 1. The learning/evaluation data generating means 15 specifies feature points on the learning image 52 corresponding to these feature point candidates 2. The learning/evaluation data generating means 15 can accurately find positions of feature points on the learning image 52 from the positions of the feature points on the three-dimensional shape model 1 specified as the feature point candidates 2 and the condition related to the posture used upon generation of a CG image (learning image) (the orientation of the three-dimensional shape model). The positions of the feature points on this learning image 52 correspond to correct position data 53 of feature points.

Figure 5:
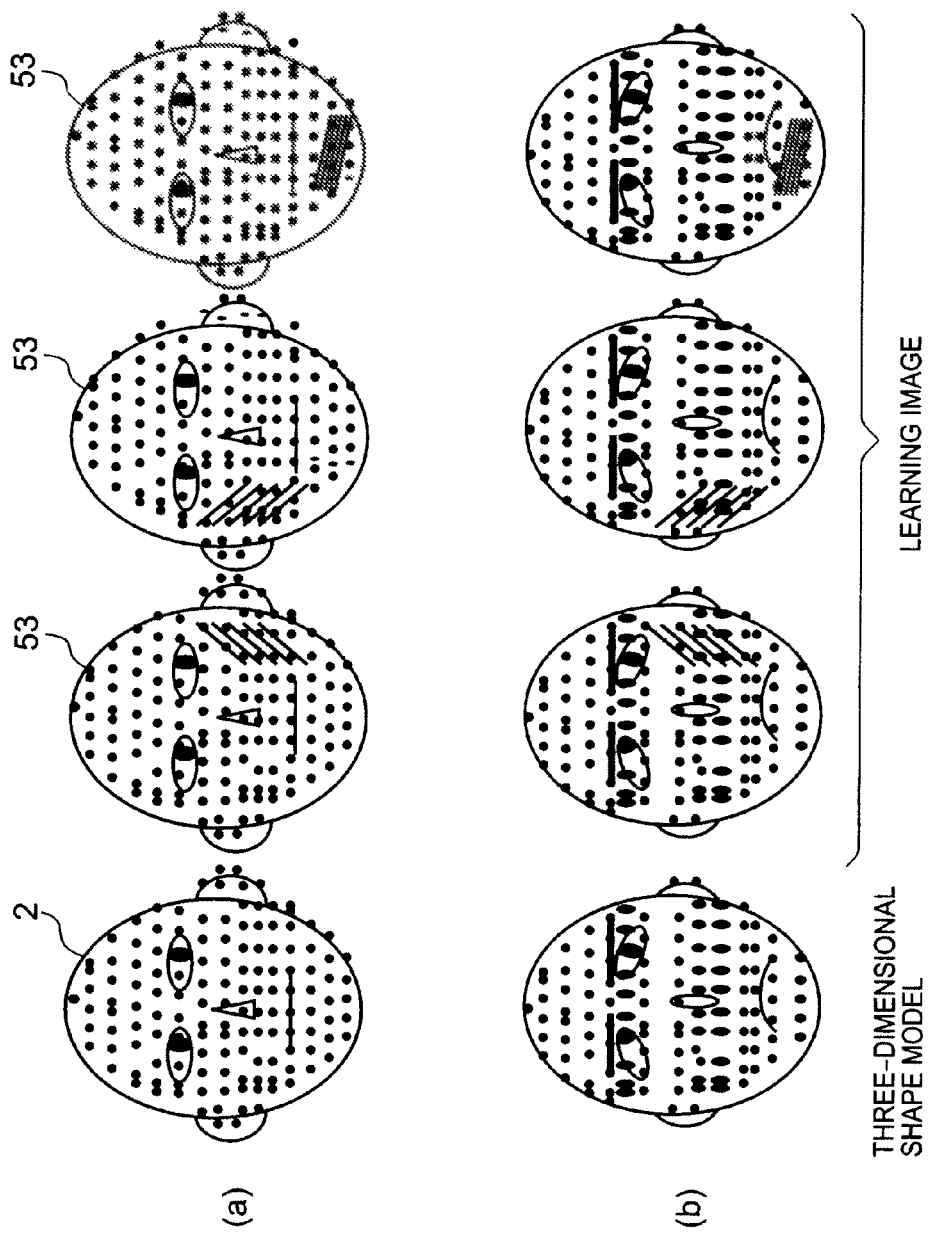
FIG. 5 illustrates an explanatory view that illustrates examples of correct position data of feature points.

FIG. 5 illustrates an explanatory view that illustrates examples of the correct position data 53 of feature points. At left ends in FIGS. 5(*a*) and (*b*), three-dimensional shape models, and the feature point candidates 2 on the three-dimensional shape models are illustrated. Meanwhile, every three-dimensional shape model is also shown schematically and two-dimensionally. In FIGS. 5(*a*) and (*b*), three images on the right side are two-dimensional learning image generated from the three-dimensional shape model illustrated at the left end, respectively, and, with examples illustrated in FIG. 5, shadows appear similar to FIG. 4. The learning/evaluation data generating means 15 specifies the correct position data 53 of feature points corresponding to the feature point candidates 2 specified as feature points on the three-dimensional shape model on this learning image. Although FIG. 5 illustrates a case in which the orientation of the face in each learning image is the same, even when the condition related to the posture (orientation) is changed, the learning/evaluation data generating means 15 specifies the correct position data 53 of the feature points on the learning image from the condition and the positions of the feature points specified on the three-dimensional shape model 1 (feature point candidates 2).

Further, the learning/evaluation data generating means 15 gives a correct answer of the recognition task for each evaluation image 6, and makes recognition result correct data 5. When, for example, posture estimation is executed as the recognition task, the condition related to the posture used upon generation of each evaluation image only needs to be used as the recognition result correct data 5. Further, when individual identification is executed as the recognition task, identification information for specifying an individual of the three-dimensional shape model used upon generation of each evaluation image only needs to be used as the recognition result correct data 5.

The feat-ex learning data generating means 16 clips a plurality of templates which correspond to feature points and a plurality of templates which do not correspond to feature points, from the learning image 52 included in the learning data 51. As templates which correspond to feature points, a plurality of templates determined based on a template size only need to be clipped from the learning image 52 around feature points or points near the feature points in the learning image 52. Further, as templates which do not correspond to feature points, a plurality of templates which include points around the feature points as a center and which do not include feature points only need to be clipped from the learning image 52. In this case, the feat-ex learning data generating means 16 only needs to decide the feature point in the learning image 52 based on the correct position data 53 of the feature point. Further, the template size only needs to be specified by, for example, being input as input data. Meanwhile, the template size may be specified according to another specifying mode.

Hereinafter, a template which corresponds to a feature point is described as a feature point template 57, and a template which does not correspond to a feature point is described as a non-feature point template 58. Further, the feature point template 57 and the non-feature point template 58 are described as feature point extraction learning data 56 together.

The feature point extractor learning means 17 learns internal data of the feature point extractor. That is, the feature point extractor learning means 17 generates internal data of the feature point extractor for deciding whether or not a given pattern is a feature point. The feature point extractor learning means 17 learns internal data 59 referring to a plurality of feature point templates 57 and a plurality of non-feature point templates 58 generated by the feat-ex learning data generating means 16.

The feature point extraction executing means 18 sequentially clips a local template for each evaluation image 6 in the evaluation data 3 generated by the learning/evaluation data generating means 15, compares the template and the internal data 59, and decides whether or not this template corresponds to the feature point. The feature point extraction executing means 18 decides which portion in each evaluation image 6 is a feature point according to decision processing. This decision result is the feature point data 4.

The learning/evaluation data generating means 15, the feat-ex learning data generating means 16, the feature point extractor learning means 17 and the feature point extraction executing means 18 according to the second embodiment are realized by, for example, a CPU of a computer which operates according to a feature point selecting program. For example, the CPU may read the feature point selecting program, and operate as each of the above means 11 to 18 according to this program. Alternatively, each of the means 11 to 18 may be realized by separate dedicated circuits.

Next, an operation will be described.

Figure 6:
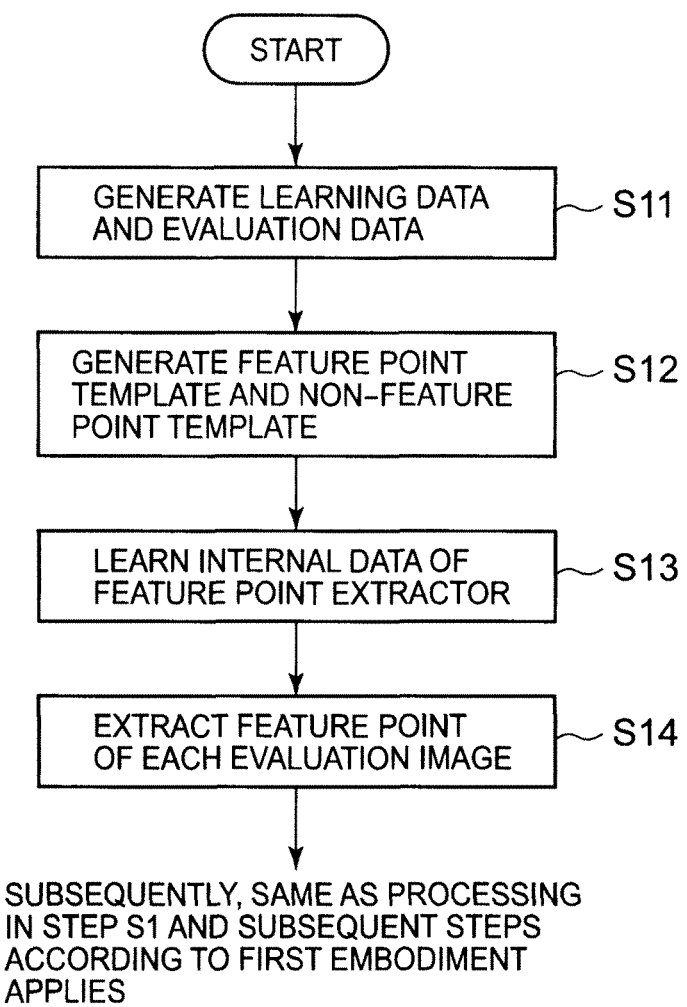
FIG. 6 illustrates a flowchart that illustrates an example of a processing flow according to the second embodiment.

FIG. 6 illustrates a flowchart that illustrates an example of a processing flow according to the second embodiment. Meanwhile, the same processing as in the first embodiment will not be described.

First, the learning/evaluation data generating means 15 generates the learning image 52 and correct position data 53 of a feature point on this learning image 52 using the input three-dimensional shape model 1 and feature point candidates 2. Further, the learning/evaluation data generating means 15 also generates the evaluation image 6, and the recognition result correct data 5 representing a correct answer of a recognition result when the recognition task is executed for the evaluation image 6 (step S11).

Next, the feat-ex learning data generating means 16 clips the feature point template 57 and the non-feature point template 58 from the learning image 52 based on the learning image 52 generated in step S11 and the correct position data 53 of the feature point (step S12).

Next, the feature point extractor learning means 17 learns the internal data 59 of the feature point extractor referring to the feature point template 57 and the non-feature point template 58 (step S13).

Subsequently, the feature point extraction executing means 18 extracts a feature point from each evaluation image 6 (step S14). More specifically, the feature point extraction executing means 18 sequentially clips local templates, compares the clipped templates and the internal data 59, and decide whether or not the templates correspond to feature points. When deciding that the template corresponds to the feature point, the feature point extraction executing means 18 sets the position of the template in the evaluation image as the position of the feature point, and sets the position of the feature point as the feature point data 4.

According to the above processing, the evaluation image 6 and the recognition result correct data 5 generated in step S11 by the learning/evaluation data generating means 15, and the feature point data 4 set in step S14 by the feature point extraction executing means 18 correspond to the evaluation data 3 according to the first embodiment. After step S14, the recognition task executing means 11, the recognition error evaluating means 12, the feature point importance determining means 13 and the feature point selecting means 14 execute the same processing (processing in step S1 and subsequent steps) as in the first embodiment, using the above evaluation image 6, recognition result correct data 5, feature point data 4, and three-dimensional shape model 1 and feature point candidates 2 which are input data. The processing is the same as in the first embodiment, and will not be described.

According to the second embodiment, it is possible to select an adequate feature point matching processing executed as the recognition task similar to the first embodiment. Further, with the second embodiment, the input data only needs to be the three-dimensional shape model 1 and a plurality of feature point candidates 2 on the three-dimensional shape model 1, so that it is possible to reduce the number of items of input data compared to the first embodiment. That is, the evaluation image 6, the recognition result correct data 5 and the feature point data 4 corresponding to the evaluation data 3 according to the first embodiment are generated by the feature point selecting system, and does not need to be input as input data. Consequently, it is possible to reduce cost for preparing for input data.

As described above, according to the second embodiment, the learning data 51 and the evaluation data 3 are automatically generated using the three-dimensional shape model 1 and an arrangement of feature point candidates (feature point candidates 2) as input data, and utilizing the three-dimensional shape model 1. By automatically generating the learning data 51 in this way, it is possible to prepare for the feature point extraction learning data 56 for a great number of feature point candidates, and provide the internal data 59 of the feature point extractor. Further, also by automatically generating the evaluation data 3 (the evaluation image 6, the recognition result correct data 5 and the feature point data 4) for estimating the recognition error when the specified recognition task is executed for various images, it is possible to reduce cost for preparing for data.

In addition, when, for example, the number of feature point candidates 2 are narrowed down to a small number, the learning data 51 can be prepared separately in some cases. Further, in some cases, it is possible to obtain an evaluation image for which correct data of the recognition task is prepared in advance. Even in this case, a configuration may be employed without the learning/evaluation data generating means 15 according to the present embodiment. Further, adequate feature points may be selected by executing processing in step S12 and subsequent steps using the learning data 51, the evaluation image 6 and the recognition result correct data 5 which are additionally prepared.

Third Embodiment

Figure 7:
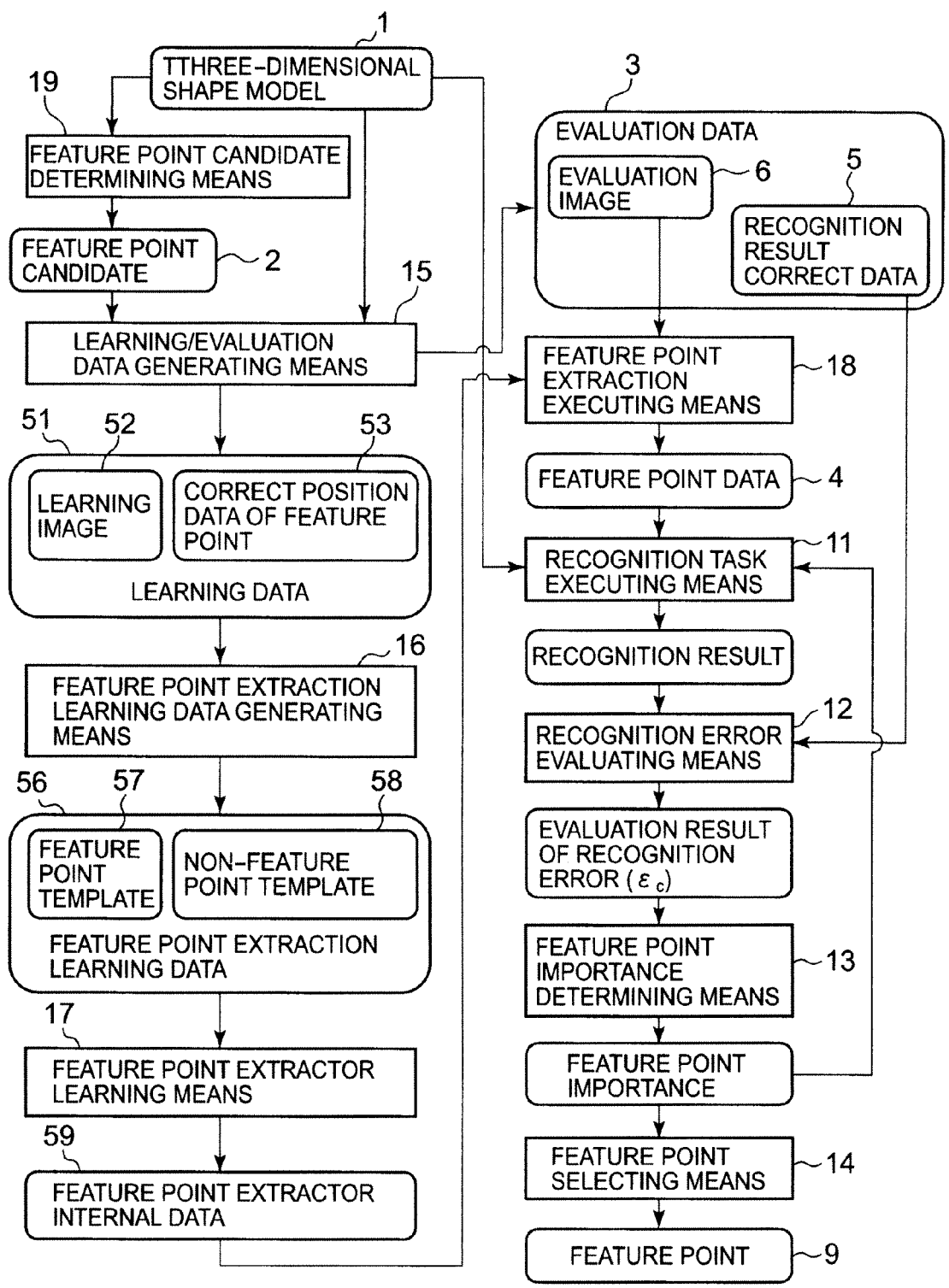
FIG. 7 illustrates a block diagram that illustrates an example of a feature point selecting system according to a third embodiment of the present invention.

FIG. 7 illustrates a block diagram that illustrates an example of a feature point selecting system according to a third embodiment of the present invention. The same components and data as in the first embodiment and the second embodiment will be assigned the same reference numerals as in FIGS. 1 and 3, and will not be described in detail. The feature point selecting system according to the third embodiment has a recognition task executing means 11, a recognition error evaluating means 12, a feature point importance determining means 13, a feature point selecting means 14, a learning/evaluation data generating means 15, a feat-ex learning data generating means 16, a feature point extractor learning means 17 and a feature point extraction executing means 18, and, in addition, a feature point candidate determining means 19.

The feature point selecting system according to the third embodiment receives input data of a three-dimensional shape model 1, and automatically generates feature point candidates 2 which are candidates of feature points on the three-dimensional shape model 1, and evaluation data 3 (an evaluation image 6, recognition result correct data 5 and feature point data 4). Hence, the feature point candidates 2 and the evaluation data 3 do not need to be input to the feature point selecting system. Further, with the feature point selecting system according to the third embodiment, the feature point candidate determining means 19 determines a great number of feature points as the feature point candidates 2 and, as a result, can select the feature points without missing important points.

The feature point candidate determining means 19 applies a feature extraction operator such as an edge extraction operator to a texture image representing a pattern on the surface of the three-dimensional shape model 1, and determines a portion of a strong feature intensity as a feature point candidate. Although various techniques are known as feature extraction operators, it is possible to perform, for example, the above SIFT feature extraction and use, for example, a corner detector. The feature point candidate determining means 19 may determine feature point candidates using a plurality of feature point extractors (feature extraction operators), and set all feature point candidates determined by individual feature point extractors as the feature point candidates 2. Further, the feature point candidate determining means 19 may add feature point candidates by applying feature point extraction to shape data of the surface of the three-dimensional shape model 1 in addition to a texture image, and extracting a feature point.

The feature point candidates determined by the feature point candidate determining means 19 correspond to the feature point candidates 2 according to the first embodiment and the second embodiment. When the feature point candidates 2 are determined by the feature point candidate determining means 19, the learning/evaluation data generating means 15 generates learning data 51 and the evaluation data 3 using the three-dimensional shape model 1 given as input data and the feature point candidates 2 similar to the second embodiment. The subsequent operations are the same as in the second embodiment, and will not be described.

The feature point candidate determining means 19 is realized by a CPU which operates according to, for example, a feature point selecting program similar to each of other means. Further, the feature point candidate determining means 19 may be realized by another dedicated circuit separate from another means.

As described above, the feature point candidate determining means 19 can determine a great number of feature point candidates by applying a feature extraction operator to a texture image of the three-dimensional shape model 1, or extracting the feature point from the shape. Particularly, by applying a plurality of types of feature extraction operators, it is possible to determine a great number of feature point candidates. These feature point candidates include many feature points which are not necessarily effective for the recognition task. However, points from which features are easily extracted on an image are always included in feature point candidates. Consequently, it is possible to use feature point candidates without missing important points for the recognition task reliably compared to a case where, for example, the feature point candidates 2 are specified by an operator. Further, even when there are feature points which are not determined in advance as the feature point candidates 2 in input data, it is possible to automatically generate the feature point extractor, so that it is possible to provide an advantage of immediately constructing the system which executes the recognition task.

Figure 8:
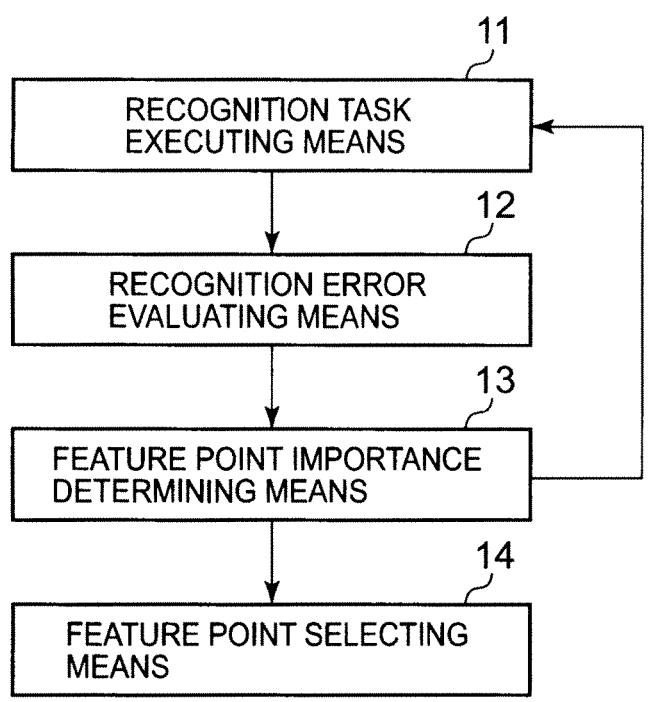
FIG. 8 illustrates a block diagram that illustrates an example of a minimum configuration according to the present invention.

Next, the minimum configuration according to the present invention will be described. FIG. 8 illustrates a block diagram that illustrates an example of the minimum configuration according to the present invention. The feature point selecting system according to the present invention has the recognition task executing means 11, the recognition error evaluating means 12, the feature point importance determining means 13 and the feature point selecting means 14.

The recognition task executing means 11 executes the recognition task using the importance of each of a plurality of feature point candidates on the three-dimensional shape model for a plurality of evaluation images which are generated from the three-dimensional model and which are used to evaluate a recognition error in the recognition task.

The recognition error evaluating means 12 evaluates the recognition error related to all evaluation images based on a difference between a recognition result of the recognition task executing means 11 and correct data of the recognition task for each evaluation image.

The feature point importance determining means 13 determines the importance of each feature point candidate by setting a cost function which is a function for the importance of each feature point candidate and which is represented as a function obtained by adding a restriction condition that an importance of an unimportant feature point candidate becomes close to zero, to the recognition error related to all evaluation images, and calculating the importance of each feature point candidate which minimizes a value of the cost function.

Further, with the recognition task executing means 11, the recognition error evaluating means 12 and the feature point importance determining means 13, until the value of the cost function set according to the importance of each feature point candidate determined by the feature point importance determining means 13 converges, repeatedly, the recognition task executing means 11 executes the recognition task, the recognition error evaluating means 12 evaluates the recognition error related to all evaluation images and the feature point importance determining means 13 determines the importance of each feature point candidate.

The feature point selecting means 14 selects a feature point which needs to be used in the recognition task, from the feature point candidates on the three-dimensional shape model based on the importance of each feature point candidate.

According to the above configuration, it is possible to select a feature point suitable for a recognition algorithm in the recognition task, from the feature point candidates on the three-dimensional shape model.

In addition, with the above embodiments, the following characteristic configurations (1) to (10) of the feature point selecting system are disclosed.

(1) The feature point selecting system according to the present invention has: a recognition task executing means (for example, the recognition task executing means 11) that executes a recognition task using an importance of each of a plurality of feature point candidates on a three-dimensional shape model for a plurality of evaluation images which are generated from the three-dimensional shape model and which are used to evaluate a recognition error in the recognition task; a recognition error evaluating means (for example, the recognition error evaluating means 12) that evaluates a recognition error related to all evaluation images from a difference between a recognition result of the recognition task executing means and correct data of the recognition task for each evaluation image; a feature point importance determining means (for example, the feature point importance determining means 13) that determines the importance of each feature point candidate by setting a cost function which is a function for the importance of each feature point candidate and which is represented as a function obtained by adding a restriction condition that an importance of an unimportant feature point candidate becomes close to zero, to the recognition error related to the all evaluation images, and calculating the importance of each feature point candidate which minimizes a value of the cost function; and a feature point selecting means (for example, the feature point selecting means 14) that selects a feature point which needs to be used in the recognition task from the feature point candidates on the three-dimensional shape model based on the importance of each feature point candidate, and, with the recognition task executing means, the recognition error evaluating means and the feature point importance determining means, until the value of the cost function which is set based on the importance of each feature point candidate determined by the feature point importance determining means converges, repeatedly, the recognition task executing means executes the recognition task, the recognition error evaluating means evaluates the recognition error related to the all evaluation images and the feature point importance determining means determines the importance of the feature point candidates.

(2) The feature point selecting system according to the present invention may employ a configuration where the feature point importance determining means excludes from a processing target of the recognition task a feature point candidate having an importance equal to or less than a threshold determined in advance.

(3) The feature point selecting system according to the present invention may employ a configuration including: a learning/evaluation data generating means (for example, the learning/evaluation data generating means 15) that creates a plurality of evaluation images from the three-dimensional shape model and correct data of the recognition task for each evaluation image, generates a plurality of learning images which are generated from the three-dimensional shape model and which are used to learn decision data of a feature point extractor (for example, the internal data of the feature point extractor), and generates position data representing a position of each feature point candidate on the three-dimensional shape model on each learning image; a local area clipping means (for example, the feature point extraction learning data generating means 16) that clips a local area (for example, the feature point template 57) which corresponds to a feature point from each learning image and a local area (for example, the non-feature point template 58) which does not correspond to a feature point, based on each learning image and the position data generated by the learning/evaluation data generating means; a feature point extractor learning means (for example, the feature point extractor learning means 17) that learns the decision data of the feature point extractor based on the local area which corresponds to the feature point and the local area which does not correspond to the feature point; and a feature point extraction executing means (for example, the feature point extraction executing means 18) that extracts a feature point from each evaluation image using the decision data.

(4) The feature point selecting system according to the present invention may employ a configuration including a feature point candidate determining means (for example, the feature point candidate determining means 19) that determines from the three-dimensional shape model a point which serves as a feature point candidate on the three-dimensional shape model.

(5) The feature point selecting system according to the present invention may employ a configuration where the feature point candidate determining means determines a point which serves as the feature point candidate by applying a plurality of types of feature extraction operators to a texture image of the three-dimensional shape model and a shape of the three-dimensional shape model, and extracting the point which serves as the feature point candidate.

(6) The feature point selecting system according to the present invention has: a recognition task executing unit (for example, the recognition task executing means 11) that executes a recognition task using an importance of each of a plurality of feature point candidates on a three-dimensional shape model for a plurality of evaluation images which are generated from the three-dimensional shape model and which are used to evaluate a recognition error in the recognition task; a recognition error evaluating unit (for example, the recognition error evaluating means 12) that evaluates a recognition error related to all evaluation images from a difference between a recognition result of the recognition task executing unit and correct data of the recognition task for each evaluation image; a feature point importance determining unit (for example, the feature point importance determining means 13) that determines the importance of each feature point candidate by setting a cost function which is a function for the importance of each feature point candidate and which is represented as a function obtained by adding a restriction condition that an importance of an unimportant feature point candidate becomes close to zero, to the recognition error related to the all evaluation images, and calculating the importance of each feature point candidate which minimizes a value of the cost function; and a feature point selecting unit (for example, the feature point selecting means 14) that selects a feature point which needs to be used in the recognition task from the feature point candidates on the three-dimensional shape model based on the importance of each feature point candidate, and, with the recognition task executing unit, the recognition error evaluating unit and the feature point importance determining unit, until the value of the cost function which is set based on the importance of each feature point candidate determined by the feature point importance determining unit converges, repeatedly, the recognition task executing unit executes the recognition task, the recognition error evaluating unit evaluates the recognition error related to the all evaluation images and the feature point importance determining unit determines the importance of the feature point candidates.

(7) The feature point selecting system according to the present invention may employ a configuration where the feature point importance determining unit excludes a feature point candidate comprising an importance equal to or less than a threshold determined in advance, from a processing target of the recognition task.

(8) The feature point selecting system according to the present invention may employ a configuration including: a learning/evaluation data generating unit (for example, the learning/evaluation data generating means 15) that creates a plurality of evaluation images from the three-dimensional shape model and correct data of the recognition task for each evaluation image, generates a plurality of learning images which are generated from the three-dimensional shape model and which are used to learn decision data of a feature point extractor (for example, the internal data of the feature point extractor), and generates position data representing a position of each feature point candidate on the three-dimensional shape model on each learning image; a local area clipping unit (for example, the feature point extraction learning data generating means 16) that clips a local area (for example, the feature point template 57) which corresponds to a feature point from each learning image and a local area (for example, the non-feature point template 58) which does not correspond to a feature point, based on each learning image and the position data generated by the learning/evaluation data generating unit; a feature point extractor learning unit (for example, the feature point extractor learning means 17) that learns the decision data of the feature point extractor based on the local area which corresponds to the feature point and the local area which does not correspond to the feature point; and a feature point extraction executing unit (for example, the feature point extraction executing means 18) that extracts a feature point from each evaluation image using the decision data.

(9) The feature point selecting system according to the present invention may employ a configuration including a feature point candidate determining unit (for example, the feature point candidate determining means 19) that determines from the three-dimensional shape model a point which serves as a feature point candidate on the three-dimensional shape model.

(10) The feature point selecting system according to the present invention may employ a configuration where the feature point candidate determining unit determines a point which serves as the feature point candidate by applying a plurality of types of feature extraction operators to a texture image of the three-dimensional shape model and a shape of the three-dimensional shape model, and extracting the point which serves as the feature point candidate.

Although the present invention has been described with reference to the embodiments, the present invention is by no means limited to the above embodiments. The configuration and the details of the present invention can be variously modified in a scope of the present invention which one of ordinary skill in the art can understand.

This application claims priority to Japanese Patent Application No. 2010-003883 filed on Jan. 12, 2010, the entire contents of which are incorporated by reference herein.

INDUSTRIAL APPLICABILITY

The present invention are suitable for use as a system which determines a feature point on a three-dimensional shape model used for a recognition task in, for example, a device which executes the recognition task such as posture estimation of an individual or individual identification.

REFERENCE SIGNS LIST

11 RECOGNITION TASK EXECUTING MEANS
12 RECOGNITION ERROR EVALUATING MEANS
13 FEATURE POINT IMPORTANCE DETERMINING MEANS
14 FEATURE POINT SELECTING MEANS

15 LEARNING/EVALUATION DATA GENERATING MEANS
16 FEATURE POINT EXTRACTION LEARNING DATA GENERATING MEANS (FEAT-EX LEARNING DATA GENERATING MEANS)
17 FEATURE POINT EXTRACTOR LEARNING MEANS
18 FEATURE POINT EXTRACTION EXECUTING MEANS
19 FEATURE POINT CANDIDATE DETERMINING MEANS

The invention claimed is:

1. A feature point selecting system comprising:
   a recognition task executing unit that executes a recognition task using an importance of each of a plurality of feature point candidates on a three-dimensional shape model for a plurality of evaluation images which are generated from the three-dimensional shape model and which are used to evaluate a recognition error in the recognition task;
   a recognition error evaluating unit that evaluates a recognition error related to all evaluation images from a difference between a recognition result of the recognition task executing unit and correct data of the recognition task for each evaluation image;
   a feature point importance determining unit that determines the importance of each feature point candidate by setting a cost function which is a function for the importance of each feature point candidate and which is represented as a function obtained by adding a restriction condition that an importance of an unimportant feature point candidate becomes close to zero, to the recognition error related to the all evaluation images, and calculating the importance of each feature point candidate which minimizes a value of the cost function; and
   a feature point selecting unit that selects a feature point which needs to be used in the recognition task from the feature point candidates on the three-dimensional shape model based on the importance of each feature point candidate,
   wherein, with the recognition task executing unit, the recognition error evaluating unit and the feature point importance determining unit, until the value of the cost function which is set based on the importance of each feature point candidate determined by the feature point importance determining unit converges, repeatedly, the recognition task executing unit executes the recognition task, the recognition error evaluating unit evaluates the recognition error related to the all evaluation images and the feature point importance determining unit determines the importance of the feature point candidates.

2. The feature point selecting system according to claim 1, wherein the feature point importance determining unit excludes from a processing target of the recognition task a feature point candidate comprising an importance equal to or less than a threshold determined in advance.

3. The feature point selecting system according to claim 2, further comprising:
   a learning/evaluation data generating unit that creates a plurality of evaluation images from the three-dimensional shape model and correct data of the recognition task for each evaluation image, generates a plurality of learning images which are generated from the three-dimensional shape model and which are used to learn decision data of a feature point extractor, and generates position data representing a position of each feature point candidate on the three-dimensional shape model on each learning image;
   a local area clipping unit that clips a local area which corresponds to a feature point from each learning image and a local area which does not correspond to a feature point, based on each learning image and the position data generated by the learning/evaluation data generating unit;
   a feature point extractor learning unit which learns the decision data of the feature point extractor based on the local area which correspond to the feature point and the local area which does not correspond to the feature point; and
   a feature point extraction executing unit that extracts a feature point from each evaluation image using the decision data.

4. The feature point selecting system according to claim 1, further comprising:
   a learning/evaluation data generating unit that creates a plurality of evaluation images from the three-dimensional shape model and correct data of the recognition task for each evaluation image, generates a plurality of learning images which are generated from the three-dimensional shape model and which are used to learn decision data of a feature point extractor, and generates position data representing a position of each feature point candidate on the three-dimensional shape model on each learning image;
   a local area clipping unit that clips a local area which corresponds to a feature point from each learning image and a local area which does not correspond to a feature point, based on each learning image and the position data generated by the learning/evaluation data generating unit;
   a feature point extractor learning unit which learns the decision data of the feature point extractor based on the local area which correspond to the feature point and the local area which does not correspond to the feature point; and
   a feature point extraction executing unit that extracts a feature point from each evaluation image using the decision data.

5. The feature point selecting system according to claim 4, further comprising a feature point candidate determining unit that determines from the three-dimensional shape model a point which serves as a feature point candidate on the three-dimensional shape model.

6. The feature point selecting system according to claim 5, wherein the feature point candidate determining unit determines a point which serves as the feature point candidate by applying a plurality of types of feature extraction operators to a texture image of the three-dimensional shape model and a shape of the three-dimensional shape model, and extracting the point which serves as the feature point candidate.

7. A feature point selecting method, comprising:
   executing a recognition task using an importance of each of a plurality of feature point candidates on a three-dimensional shape model for a plurality of evaluation images which are generated from the three-dimensional shape model and which are used to evaluate a recognition error in the recognition task;
   evaluating a recognition error related to all evaluation images from a difference between a recognition result of the recognition task and correct data of the recognition task for each evaluation image;
   determining the importance of each feature point candidate by setting a cost function which is a function for the importance of each feature point candidate and which is represented as a function obtained by adding a restriction condition that an importance of an unimportant feature point candidate becomes close to zero, to the recognition error related to the all evaluation images, and calculating the importance of each feature point candidate which minimizes a value of the cost function;

until the value of the cost function which is set based on the importance of each determined feature point candidate converges, repeatedly executing the recognition task, evaluating the recognition error related to the all evaluation images and determining the importance of the feature point candidates; and selecting a feature point which needs to be used in the recognition task from the feature point candidates on the three-dimensional shape model based on the importance of each feature point candidate such that the feature point is selected to match a recognition algorithm in the recognition task.

8. The feature point selecting method according to claim 7, wherein a feature point candidate comprising an importance equal to or less than a threshold determined in advance is excluded from a processing target of the recognition task.

9. A non-transitory computer readable information recording medium storing a feature point selecting program, which when executed by a processor, performs a method for:

executing a recognition task using an importance of each of a plurality of feature point candidates on a three-dimensional shape model for a plurality of evaluation images which are generated from the three-dimensional shape model and which are used to evaluate a recognition error in the recognition task;

evaluating a recognition error related to all evaluation images from a difference between a recognition result of the recognition task and correct data of the recognition task for each evaluation image;

determining the importance of each feature point candidate by setting a cost function which is a function for the importance of each feature point candidate and which is represented as a function obtained by adding a restriction condition that an importance of an unimportant feature point candidate becomes close to zero, to the recognition error related to the all evaluation images, and calculating the importance of each feature point candidate which minimizes a value of the cost function;

until the value of the cost function which is set based on the importance of each determined feature point candidate converges, repeatedly executing the recognition task, evaluating the recognition error related to the all evaluation images and determining the importance of the feature point candidates; and selecting a feature point which needs to be used in the recognition task from the feature point candidates on the three-dimensional shape model based on the importance of each feature point candidate.

10. The non-transitory computer readable information recording medium storing the feature point selecting program according to claim 9, which when executed by a processor, performs a method for:

wherein a feature point candidate comprising an importance equal to or less than a threshold determined in advance is excluded from a processing target of the recognition task.

* * * * *